US008567090B2

United States Patent
Bringewatt et al.

(10) Patent No.: US 8,567,090 B2
(45) Date of Patent: Oct. 29, 2013

(54) METHOD OF, AND APPARATUS FOR, TREATING THE WASTE AIR FROM HEATED LAUNDRY MACHINES

(75) Inventors: Wilhelm Bringewatt, Porta Westfalica (DE); Engelbert Heinz, Vlotho (DE)

(73) Assignee: Herbert Kannegiesser GmbH, Vlotho (DE)

( * ) Notice: Subject to any disclaimer, the term of this patent is extended or adjusted under 35 U.S.C. 154(b) by 425 days.

(21) Appl. No.: 12/607,526

(22) Filed: Oct. 28, 2009

(65) Prior Publication Data

US 2010/0107438 A1   May 6, 2010

(30) Foreign Application Priority Data

Oct. 31, 2008 (DE) .......................... 10 2008 054 104

(51) Int. Cl.
  *F26B 3/02* (2006.01)
(52) U.S. Cl.
  USPC ............ 34/497; 34/595; 34/601; 165/104.21; 38/17; 392/358
(58) Field of Classification Search
  USPC ........... 34/413, 381, 497, 595, 601, 606, 602, 34/610; 165/104.21; 62/333; 122/39; 392/358, 377; 38/17, 44
  See application file for complete search history.

(56) References Cited

U.S. PATENT DOCUMENTS

| | | | |
|---|---|---|---|
| 4,112,590 A * | 9/1978 | Muller | 34/75 |
| 4,326,344 A * | 4/1982 | Smith | 34/566 |
| 4,461,345 A * | 7/1984 | Vandervaart | 165/113 |
| 4,548,262 A | 10/1985 | Hall | |
| 4,660,627 A * | 4/1987 | Deck | 165/86 |
| 4,928,749 A * | 5/1990 | Paull | 165/119 |
| 5,046,478 A * | 9/1991 | Clawson | 126/110 R |
| 5,076,350 A * | 12/1991 | Grantz et al. | 165/104.21 |
| 2005/0120715 A1* | 6/2005 | Labrador | 60/618 |
| 2010/0107438 A1* | 5/2010 | Bringewatt et al. | 34/467 |
| 2012/0030960 A1* | 2/2012 | Ryoo et al. | 34/86 |

FOREIGN PATENT DOCUMENTS

| | | |
|---|---|---|
| DE | 24 50 497 | 10/1974 |
| DE | 33 36 367 | 10/1983 |
| DE | 196 00 489 | 1/1996 |

(Continued)

*Primary Examiner* — Steven M Gravini
(74) *Attorney, Agent, or Firm* — Laurence P. Colton; Smith Risley Tempel Santos LLC

(57) ABSTRACT

Humid waste air is produced in heated laundry machines. This humid waste air has a still relatively high temperature. In order for the energy contained in the humid waste air to be recovered, at least in part, the humid waste air is directed through a heat exchanger (12). Condensate is produced in the heat exchanger (12), and it has proven difficult, in the case of known heat exchangers (12), for this condensate to be directed away. Moreover, the humid waste air contains accompanying substances, for example fluff from the treated laundry. These accompanying substances are deposited in known heat exchangers (12), which adversely affect the efficiency of the heat exchanger (12) over time. The invention makes provision for the heat exchanger (12) to be equipped with upright heat-exchanger plates (13), from which the condensate can run off. The condensate can then be discharged in a specific manner out of the heat exchanger (12). The invention further provides for the accompanying substances to be separated from the humid waste air at least in part in the heat exchanger (12) and to be directed away together with the condensate. It is thus no longer possible for the accompanying substances to settle in the heat exchanger (12) and adversely affect its effectiveness.

13 Claims, 3 Drawing Sheets

(56) References Cited

FOREIGN PATENT DOCUMENTS

| | | |
|---|---|---|
| DE | 10 2007 004 100 | 7/2008 |
| DE | 10 2007 043 212 | 9/2008 |
| DE | 10 2007 018784 | 10/2008 |
| EP | 94356 A1 * 11/1983 | .............. D06F 58/10 |
| EP | 481178 A1 * 4/1992 | .............. D06F 58/24 |
| EP | 774637 A2 * 5/1997 | ................ F28D 1/03 |
| GB | 2142128 A * 1/1985 | .............. F26B 21/08 |
| JP | 04226700 A * 8/1992 | .............. D06F 58/02 |
| JP | 2009195362 A * 9/2009 | |
| WO | 2008/113430 | 9/2008 |

* cited by examiner

METHOD OF, AND APPARATUS FOR, TREATING THE WASTE AIR FROM HEATED LAUNDRY MACHINES

STATEMENT OF RELATED APPLICATIONS

This patent application is based on and claims the benefit of German Patent Application No. DE 10 2008 054 104.4 having a filing date of 31 Oct. 2008, which is incorporated herein in its entirety by this reference.

BACKGROUND OF THE INVENTION

1. Technical Field

The invention relates to a method of treating waste heat from heated laundry machines, the still hot, humid waste air being directed through a heat exchanger and condensate forming in the heat exchanger as the humid waste air cools. The invention also relates to an apparatus for treating the waste air from laundry machines, having a heat exchanger with heat-exchanger plates, with the waste air flowing along the outside of the heat-exchanger plates.

2. Prior Art

In part, considerable quantities of energy, to be precise of heat energy in particular, are required for operating the laundry machines in commercial laundries. This applies, in particular, to mangles, driers and finishers. In order to recover this energy, at least in part, it is known for the energy which is produced or given off during the operation of laundry machines to be directed through a heat exchanger, as a result of which preferably liquid which is required in laundries, for example cold water, is heated up.

The waste heat is humid waste air from laundry machines which has various accompanying substances in it. Such accompanying substances are predominantly constituted by fluff from the items of laundry which are to be treated. However, the accompanying substances may also be residues of mangle wax, detergent or the like. These accompanying substances result, over time, in the heat exchanger being adversely affected. In particular the effectiveness of the heat exchanger suffers as a result.

BRIEF SUMMARY OF THE INVENTION

Taking the above as a departure point, the object of the invention is to provide a method of, and an apparatus for, treating, in particular recovering, the waste heat from heated laundry machines in order to be able to improve the effectiveness of the recovery of the energy contained in the waste heat.

A method used for achieving this object is a method of treating the waste air from heated laundry machines, the still hot, humid waste air being directed through a heat exchanger and condensate forming in the heat exchanger as the humid waste air cools, characterized in that the condensate separates the waste air, at least in part, from accompanying substances contained in the same. Accordingly, provision is made for the accompanying substances to be removed, at least in part, from the humid waste air by means of the condensate which is produced as the waste air cools. It has been found that the heat exchanger can thus effectively be kept free of the accompanying substances in the hot waste air. It is possible in particular for the accompanying substances to be discharged out of the heat exchanger together with the condensate.

The humid waste air from heated laundry machines is particularly suitable for heating up, or preheating, liquids which are required in the laundry. The humid waste air is preferably suitable for heating water as is required, for example for washing machines. For this purpose, use is made of heat exchangers which utilize the energy of the waste air in order to heat (up) a liquid medium, for example clean water, in particular cold clean water. The operating conditions of a heat exchanger give rise, as the humid waste air cools, to condensation of the humidity contained in the waste air. Provision is preferably made, during the formation of the condensate, for the waste air to be separated from at least some of the accompanying substances, preferably from most of the accompanying substances or even all of the accompanying substances. During the formation of the condensate, the accompanying substances are bound by the same. It is thus possible for the accompanying substances from the humid waste air from the laundry machines to be discharged, at least for the most part, with the condensate.

In a preferred configuration of the method, provision is made for at least some of the accompanying substances to be washed out of the humid waste air. The condensate is particularly suitable for this purpose, in which case the condensate which forms as the waste air cools entrains the accompanying substances and thus washes them out of the waste air. This makes it possible for the accompanying substances to be separated out, as far as possible, from the waste air. At least most of the accompanying substances are thus separated from the waste air during cooling of the same.

A further configuration of the invention provides for the condensate which forms in the heat exchanger as the humid waste air cools to be discharged out of the heat exchanger. Accompanying substances from the humid waste air are entrained by the condensate here, as a result of which the accompanying substances can be directed out of the heat exchanger together with the condensate. The accompanying substances are thus automatically directed out of the heat exchanger with the condensate. The invention does not require separate discharge of the accompanying substances.

The invention makes provision for the condensate to be able to flow off from plates of the heat exchanger. As a result, the heat-exchanger surfaces of all the heat-exchanger plates are straightforwardly cleaned, and thus kept free, of the condensate and the accompanying substances. The condensate which preferably flows off the outer walls of the heat-exchanger plates can thus be directed in a collected state out of the heat exchanger. The condensate thus rinses off the accompanying substances deposited on the outer walls of the heat-exchanger plates from the outer sides of the walls of the heat exchanger plates.

According to a further proposal of the invention, the accompanying substances are entrained as the condensate flows off from the heat-exchanger plates. In this way, the accompanying substances and the condensate flow off together from the heat-exchanger plates, preferably from the upright walls of the heat exchanger plates. It is then possible for the condensate and the accompanying substances bound therein to be disposed of together, for example in an outflow. It is also conceivable, however, to filter the condensate outside the heat exchanger and thus separate it from the accompanying substances of the humid waste air, this resulting, once again, in essentially pure condensate which can be used for other purposes.

An apparatus used for achieving the object mentioned in the introduction is an apparatus for treating the waste air from laundry machines, having a heat exchanger with heat-exchanger plates, with the waste air flowing along the outside of the heat-exchanger plates, characterized in that the heat-exchanger plates are arranged in an upright state in a housing of the heat exchanger. According to this claim, provision is made for the heat-exchanger plates to be arranged in an upright state in a housing of the heat exchanger. "Upright" is understood, in this context, to mean an arrangement of all the plates in the heat exchanger in which the heat-exchanger plates are located vertically, or in an inclined state in relation to the vertical, in the housing of the heat exchanger. As a result of this arrangement of the heat-exchanger plates in the housing of the heat exchanger, condensate which forms in the heat exchanger as the humid waste air from the trough mangle cools can flow off from the oblique or vertical heat-exchanger plates. The condensate can collect on the base of the housing of the heat exchanger, from where it can be directed in a specific manner out of the heat exchanger.

It has been found that, in the case of the upright, that is to say vertical or slightly inclined, arrangement of the heat-exchanger plates in the housing of the heat exchanger, condensate which runs off from the heat-exchanger plates also discharges accompanying substances, for example fluff from the laundry, mangle wax, detergent residues or the like, in the humid waste air which is to be cooled. This straightforwardly and reliably prevents the situation where the accompanying substances from the cooled humid waste air settle in the heat exchanger, in particular on the outer walls of the heat-exchanger plates, over time.

According to a preferred configuration of the invention, the heat-exchanger plates are provided with opposite heat-exchanger surfaces, from which the condensate can flow off on the outside together with the accompanying substances because, on account of the upright heat-exchanger plates, it is also the case that the heat-exchanger surfaces of the same are upright or slightly oblique. The heat-exchanger surfaces of the heat-exchanger plates are preferably and essentially planar, but can be structured on their outer surfaces. Accordingly, a longitudinal centre plane of the respective heat-exchanger plate is located on a two-dimensional surface which is vertical or is inclined slightly in relation to the vertical. The condensate and the accompanying substances can readily flow off from such planar heat-exchanger plates or heat-exchanger surfaces, in which case the heat-exchanger surfaces can be freed more or less entirely from the condensate, and in particular also from the accompanying substances in the humid waste air which is to be discharged.

Provision is also made for longitudinal edges of the heat-exchanger plates, these edges running in the longitudinal direction of the heat exchanger, to run in an inclined state, in particular in a slightly inclined state in relation to the horizontal. For this purpose, the heat-exchanger housing enclosing all the heat-exchanger plates is also inclined in the longitudinal direction, to be precise such that, as seen in the direction in which the waste air to be cooled flows through the heat exchanger, an outlet end of the heat exchanger is located on a lower level than an inlet end of the humid waste air which is to be cooled. The condensate with the accompanying substances accumulating on the exterior heat-exchanger plates can thus flow off obliquely to the longitudinal edges of the heat-exchanger plates in the direction of the lower longitudinal edges of the heat-exchanger plates and to the outlet end of the heat exchanger, thus cleaning the outer sides of the heat-exchanger plates. The condensate with the accompanying substances flowing off the heat-exchanger plates can accumulate on the base of the housing of the heat exchanger, wherein, on account of the inclined longitudinal edges of the heat-exchanger plates and of the base of the housing running in an inclined manner in the direction of the outlet end, the condensate with the accompanying substances collects in the housing at the outlet end of the heat exchanger and here can be directed in a specific manner out of the heat exchanger.

The invention further makes provision for a plurality of identical heat-exchanger plates to be spaced apart parallel to one another in the housing of the heat exchanger. This causes flow channels for the humid waste air which is to be cooled to be created between adjacent heat-exchanger plates. Since the heat-exchanger plates run in the longitudinal direction of the elongate heat exchanger, the flow channels for the humid waste air which is to be cooled also extend longitudinally throughout the entire elongate heat exchanger, in which case the humid waste air which is to be cooled flows uniformly along all the heat-exchanger plates, and is approximately at the same temperature in particular on all the heat-exchanger plates. This results in effective cooling of the humid waste air on the plates of the heat exchanger.

A further preferred configuration of the apparatus makes provision for at least one flow channel for a liquid which is to be heated by the waste air, in particular water which is to be heated up, to be arranged in the interior of each heat-exchanger plate. The at least one flow channel ensures that the liquid which is to heated flows uniformly through the heat-exchanger plates.

The heat-exchanger plates are preferably designed in the manner of so-called cushion plates with structured outer walls. These have proven successful as effective heat-exchanger plates. They are easy to produce and save space. In particular such heat-exchanger plates have a network of flow channels which ensures that the liquid which is to be heated flows uniformly through each heat-exchanger plate. According to the invention, despite the structured outer surface of the cushion plates, the accompanying substances can be effectively freed from the outer walls of the cushion plates by the condensate flowing off the cushion plates.

BRIEF DESCRIPTION OF THE DRAWINGS

A preferred exemplary embodiment of the invention will be explained in more detail hereinbelow with reference to the drawing, in which.

DETAILED DESCRIPTION OF PREFERRED EMBODIMENTS

Figure 1:
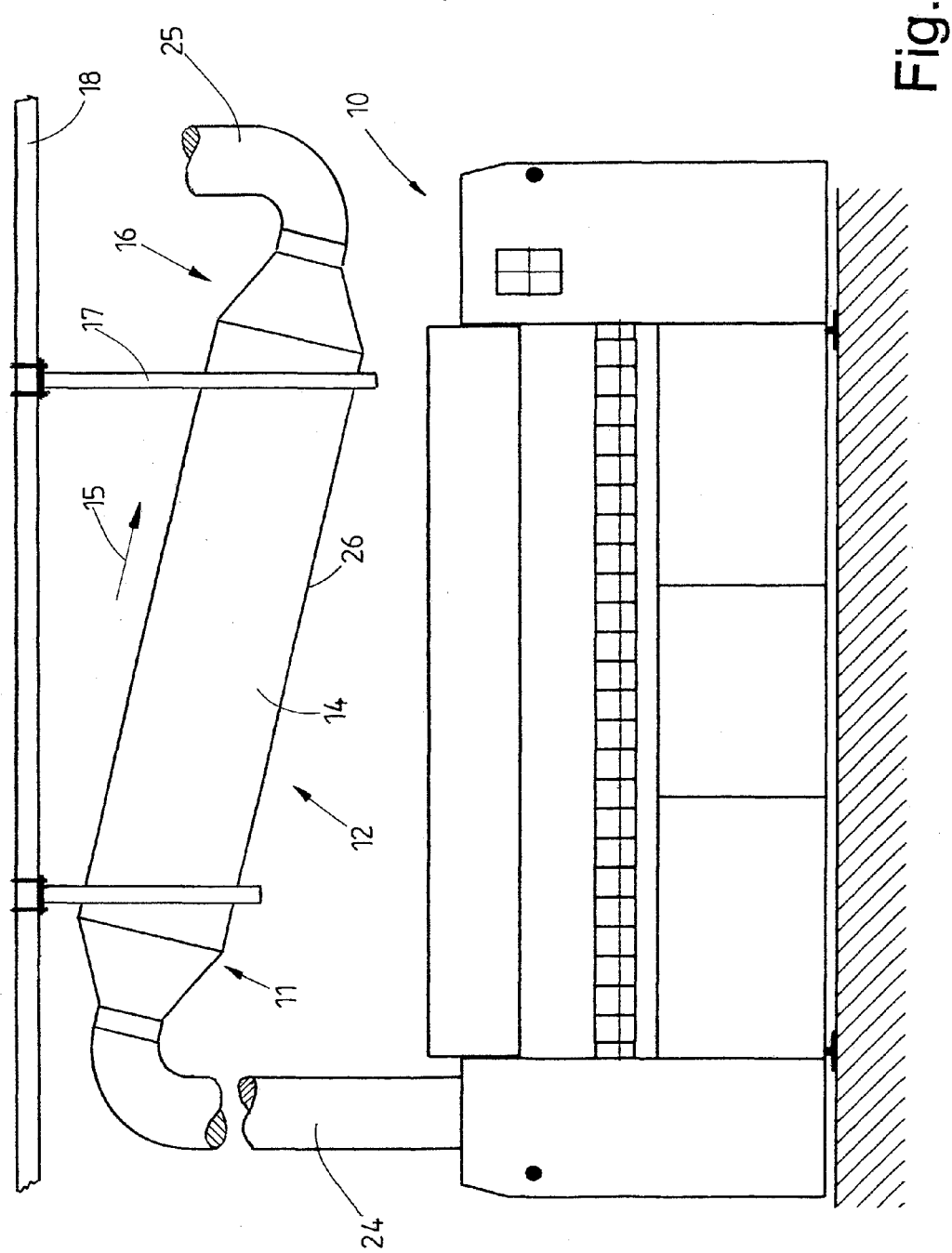
FIG. 1 shows a schematic illustration of a trough mangle with a heat exchanger for treating the humid waste air coming from the trough mangle.
Figure 2:
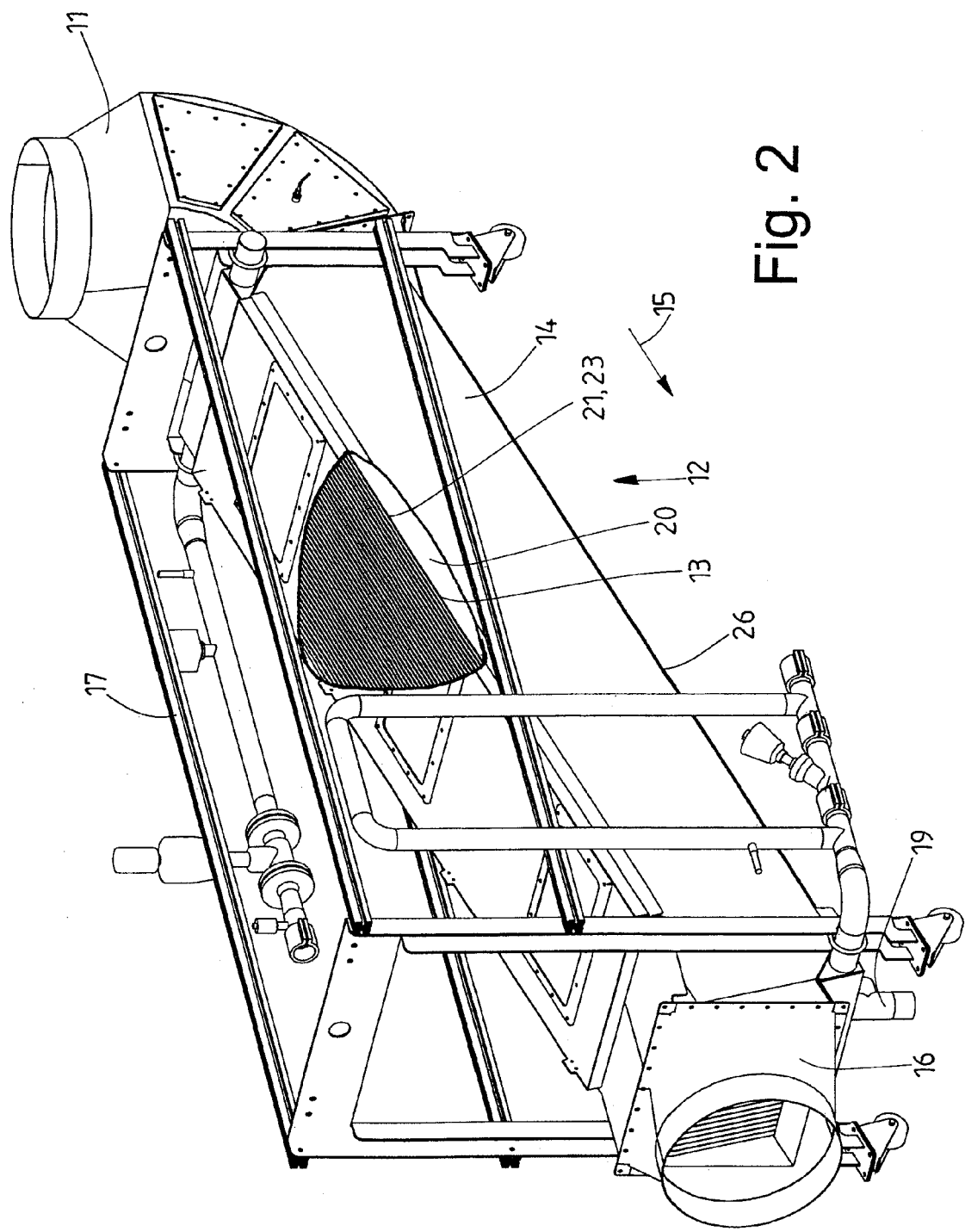
FIG. 2 shows a perspective illustration of the heat exchanger.
Figure 3:
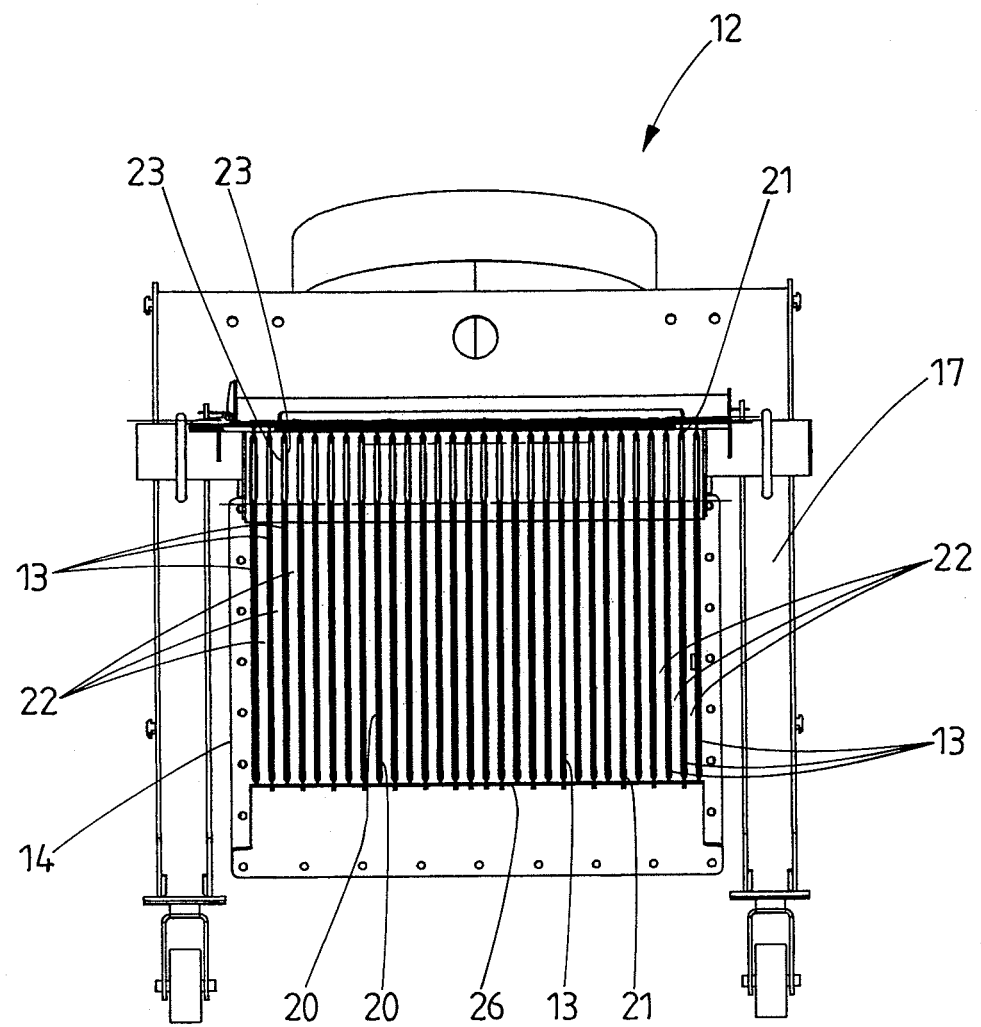
FIG. 3 shows a cross section through the heat exchanger from FIG. 2.

The invention will be explained in conjunction with a trough mangle 10 for commercial laundries which is shown schematically in FIG. 1. The invention, however, is not limited thereto.

The trough mangle 10 shown has a framework with a mangle trough and a mangle roller which can be driven in rotation. It is also possible, however, for the trough mangle 10 to have a plurality of mangle rollers and mangle troughs.

The at least one mangle trough of the trough mangle 10 is heated by steam, oil or some other heat-transfer medium. The heated mangle trough heats the damp items of laundry, which during mangling run through between the mangle trough and the mangle rollers. The residual moisture from the items of laundry evaporates here for the most part. This residual moisture is taken up by the ambient air of the mangle trough and discharged as humid waste air.

The humid waste air from the trough mangle 10 has accompanying substances, for example fluff from the laundry, mangle wax, detergent residues or the like.

The humid waste air from the trough mangle 10 is fed, with the accompanying substances, to an inlet end 11 of a heat exchanger 12. Heat energy is extracted, in the heat exchanger 12, from the humid waste air from the trough mangle 10. The waste air here is cooled, in which case the humidity in the waste air condenses, at least in part. A heat-transfer liquid is also directed through the heat exchanger 12, this liquid preferably being water (service water, clean water or the like) for the laundry which is required for operating other laundry machines, for example washing machines. The water is heated (up) by the heat energy extracted from the waste air from the trough mangle 10.

The heat exchanger 12 has a multiplicity of preferably identical heat-exchanger plates 13, which are arranged in a common elongate, cuboidal housing 14. The heat exchanger 12, through which both the humid waste air from the trough mangle 10 and the water which is to be heated flow with co-current or countercurrent action in the longitudinal direction 15, runs in an inclined state in the longitudinal direction 15, to be precise is directed downwards from the inlet end 11 to the outlet end 16. The outlet end 16 of the heat exchanger 12 is thus located on a lower level than the inlet end 11 of the heat exchanger 12.

The housing 14 of the heat exchanger 12 is enclosed by a three-dimensional frame 17. In the exemplary embodiment shown, the heat exchanger 12 is suspended by the frame 17 in an obliquely downwardly directed manner in the longitudinal direction 15, as seen in the flow direction of the humid air, on preferably horizontal carriers 18. The carriers 18 are located beneath a building roof or form a constituent part of the building roof. If appropriate, the carriers 18 (like the heat exchanger 12) may also be directed obliquely. In the exemplary embodiment shown, the frame 17 also bears connections, fittings and parts of conduits in order for the water which is to be heated up to be fed to the heat exchanger 12 and for the heated-up water to be discharged. The frame 17 also bears a condensate connection 19, as a result of which the condensate and accompanying substances coming from the cooled waste air can be discharged out of the heat exchanger 12.

According to the invention, the heat-exchanger plates 13 are arranged in an upright state in the housing 14 of the heat exchanger 12. In the exemplary embodiment shown, the heat-exchanger plates 13 are arranged in the housing 14 such that their elongate, rectangular heat-exchanger surfaces 20 run vertically. The top and bottom longitudinal edges 21 of all the heat-exchanger surfaces 20 of the heat-exchanger plates 13 here follow the oblique/inclined profile of the heat exchanger 12. Accordingly, the longitudinal edges 21 of the heat-exchanger plates 13 and the heat-exchanger surfaces 20 of the same run in an inclined state in relation to the outlet end 16 of the heat exchanger 12. Those ends of the longitudinal edges 21 which are oriented towards the outlet end 16 of the heat exchanger 12 are thus located at a lower level than those ends of the longitudinal edges 21 which are oriented towards the higher, inlet end 11. Furthermore, provision is made that at least the lower longitudinal edges 21 of all heat-exchanger plates 13 are spaced from the base 26 of the housing 14.

With the exception of design-based structuring, the heat-exchanger surfaces 20 of all the heat-exchanger plates 13 are planar. The heat-exchanger plates 13 are uniformly spaced apart parallel to one another. Flow channels 22 for the humid waste air, including the accompanying substances in the waste air, flowing through the heat exchanger 12 are thus created between the facing heat-exchanger surfaces 20 of in each case two adjacent heat-exchanger plates 13. All the flow channels 22 between the heat-exchanger plates 13 thus run vertically, like the heat-exchanger surface 20 of the heat-exchanger plates 13. Moreover, it is also the case that the flow channels 22 are inclined downwards from the inlet end 11 of the heat exchanger 12 in the direction of the outlet end 16 of the heat exchanger 12.

The identical rectangular heat-exchanger plates 13 are designed as double-walled cushion plates which have internal flow channels (not shown in the figures) for the liquid which is to be heated, in particular water, flowing through the heat-exchanger plates 13. Each heat-exchanger plate 13 is formed from two thin panels, in particular metal sheets 23, which are preferably formed from high-grade steel, such as stainless steel. The two metal sheets 23, in order to form the respective heat-exchanger plate 13, butt against one another along their peripheries and are connected, in particular welded, to one another in a fluid-tight manner all the way around the peripheries. Furthermore, the metal sheets 23 are connected to one another by a multiplicity of weld spots, which are distributed in a uniform grid on the surface of the metal sheets 23 and heat-exchanger surfaces 20 formed by the outer sides of the same, thus providing the cushion-like structuring of the outer sides of the heat-exchanger plates 13. The metal sheets 23 of each heat-exchanger plate 13 are spaced apart from one another in the regions between the weld spots and the all-round peripheries, and this results in a network of flow channels for the liquid which is to be heated up, and flows through the heat-exchanger plates 13, being present between the weld spots.

The method according to the invention will be explained hereinbelow with reference to the above-described apparatus, in particular the heat exchanger 12:

The humid waste air from the trough mangle 10, along with accompanying substances contained therein, in particular fluff, but possibly also mangle wax and possibly detergent residues and other accompanying substances produced in a laundry during treatment of the items of laundry, is extracted by suction from the region of the trough mangle 10 and directed through a waste-air conduit 24 of the mangle to the inlet end 11 of the heat exchanger 12. The humid waste air then flows through the flow channels 22 between the plates 13 of the heat exchanger 12 to the lower-level, outlet end 16 of the heat exchanger 12. The humid waste air is not just cooled here; at least some of the accompanying substances contained in the humid waste air, preferably most of the accompanying substances, are removed from the waste air in the region of the heat exchanger 12. The cooled waste air then leaves the heat exchanger 12, without accompanying substances, that is to say in the virtually cleaned or filtered state, through its lower-level, outlet end 16. Thereafter, the waste air passes through a conduit 25 into the open or to a waste-air chimney.

Moreover, a liquid which is to be heated up, in particular service water or clean water which is required in the laundry for feeding laundry machines, for example washing machines, is directed with co-current or countercurrent flow through the heat exchanger 12. This service water or clean water is preferably at room temperature. When the service water is heated up, the humid air from the trough mangle 10, which may be at temperatures of up to 140° C., is cooled to a significant extent, to be precise to approximately 70° C., possibly even to below this temperature. This results in the formation of the condensate.

In the heat exchanger 12, the humid waste air with the accompanying substances contained therein flows along the outside of the vertical heat-exchanger surfaces 20 of the heat-exchanger plates 13 disposed in an upright position in the heat exchanger 12. Since the humid waste air with the accompanying substances flows through the heat exchanger 12 in the longitudinal direction 15 and the heat-exchanger plates 13 with the flow channels 22 formed between the same for the humid waste air and the accompanying substances extend longitudinally through the heat exchanger 12, the heat-exchanger surfaces 20 of all the heat-exchanger plates 13 are brought into equal contact with humid waste air from the trough mangle 10, the temperatures of the waste air enroute longitudinally through the heat exchanger 12 being approximately identical on all the heat-exchanger surfaces 20 of the heat-exchanger plates 13.

Condensate forms in the heat exchanger 12 as the humid waste air from the trough mangle 10 cools. The condensate forms, as the humid waste air cools, on the relatively cold heat-exchanger surfaces 20 of the heat-exchanger plates 13.

As the humid waste air with the accompanying substances flows through the heat exchanger 12, the accompanying substances are separated, at least for the most part, out of the waste air. This takes place in the heat exchanger 12, to be precise as the waste air which flows through the heat exchanger 12 cools. During this cooling, the waste air is separated from the accompanying substances in the heat exchanger 12. The condensate entrains the accompanying substances in the humid waste air. The condensate serves, as it were, as a means for freeing the humid waste air from the accompanying substances. In particular the condensate washes the accompanying substances, at least for the most part, out of the humid waste air as the latter cools.

The condensate takes up the accompanying substances separated out from the humid waste air, in which case it is not just the condensate which settles on the heat-exchanger surfaces 20 of the heat-exchanger plates 13, but also the accompanying substances which are bound or entrained thereby. As a result of the heat-exchanger plates 13 being arranged in an upright state, in the exemplary embodiment shown in a vertical state, in the housing 14 of the heat exchanger 12, the condensate, with the accompanying substances, settling on the outer heat-exchanger surfaces 20 of the heat-exchanger plate 13 runs off downwards from the heat-exchanger surfaces 20 to the base 26 of the housing 14 of the heat exchanger 12. The accompanying substances from the humid waste air from the trough mangle 10 which are deposited on the structured outer sides of the cushion-like configured heat-exchanger surfaces 20 are thus washed away from the heat-exchanger surfaces 20 by means of the condensate, and the cushion-like structured heat-exchanger surfaces 20 are thus kept free from the accompanying substances and from the condensate. The accompanying substances are thus entrained to the base 26 of the housing 14 by the condensate as it flows off from the heat-exchanger surfaces 20.

As a result of the heat exchanger 12 running obliquely in the longitudinal direction 15, and of the outlet end 16 thus being located at a lower level than the inlet end 11, the condensate, which rinses off the accompanying substances from the outer walls of the heat-exchanger plates 13, collects at the lower-level outlet end 16 of the heat exchanger 12.

Due to the spacing between the base 26 of the housing 14 and the lower longitudinal edges 21 of the upright heat-exchanger plates 13, said lower longitudinal edges 21 being obliquely inclined in a downward direction toward the lower-level outlet end 16, the condensate runs downward, on one hand, and in the longitudinal direction 15 of the heat exchanger 12, on the other, to the outlet end 16, entraining the accompanying substances on the heat-exchanger surfaces 20 of the heat-exchanger plates 13 in the process. The condensate, along with the accompanying substance entrained from the outer walls of the heat-exchanger plates 13, first collects on the oblique longitudinal edges 21 of the heat-exchanger plates 13 arranged at a distance from the base 26. As a result of the inclined course of the heat-exchanger plates 13 along the inclined longitudinal edges 21, the condensate, along with the accompanying substances washed off from the heat-exchanger surfaces 20 of the heat-exchanger plates 13, also flows in the longitudinal direction 15 to the lower-level outlet end 16. As soon as substantial quantities of condensate have formed, they drop from the lower longitudinal edges 21 of the heat-exchanger plates 13 onto the base 26 of the housing 14. The condensate collecting on the base 26, along with the accompanying substances entrained from the outer walls of the heat-exchanger plates 13, then flows in the longitudinal direction 15 of the heat exchanger 12 to the lower-level outlet end 16 of the same. The condensate also entrains the accompanying substances separated out from the humid waste air, in which case the condensate, together with the accompanying substances, after dropping from the oblique lower longitudinal edges 21 of the upright heat exchanger plates 13, flows along the oblique base 26 of the housing 14 of the heat exchanger 12 to the outlet end 16 of the heat exchanger 12. The condensate with the accompanying substances collecting on the base 26 upstream of the outlet end 16 of the housing 14 is directed out of the housing 14, in the region of the outlet end 16 of the heat exchanger 12, through the condensate connection 19 at the lower-level bottom end of the base 26.

The heat exchanger 12 is thus continuously freed from the condensate with the accompanying substances, which in particular are bound in the condensate. The condensate with the accompanying substances can then be directed away to an outflow, for example a waste-water channel. It is also conceivable, however, for the condensate to be filtered, that is to say, outside the heat exchanger 12, for the condensate to have the accompanying substances, at least some accompanying substances such as fluff, removed from it and for the liquid condensate which is then freed, at least for the most part, from accompanying substances, the condensate being essentially hot water, to be reused, for example together with the liquid which is preheated in the heat exchanger 12 by the still hot waste air from the trough mangle 10.

The invention has been described above in conjunction with a trough mangle 10. However, the invention is also suitable for other heated laundry machines, in particular finishers, driers or the like.

List Of Designations 10 trough mangle
11 inlet end
12 heat exchanger
13 heat-exchanger plate
14 housing
15 longitudinal direction
16 outlet end
17 frame
18 carrier
19 condensate connection
20 heat-exchanger surface
21 longitudinal edge
22 flow channel
23 metal sheet
24 waste-air conduit of the mangle
25 conduit
26 base

What is claimed is:

1. A method of treating hot, humid waste air from heated laundry machines, comprising:
    providing a heat exchanger (12) that runs obliquely in a longitudinal direction (15), the heat exchanger comprising an inlet end (11), an outlet end (16), and heat exchanger plates (13), wherein the outlet end (16) is located at a lower level than the inlet end (11), and wherein the heat exchanger plates (13) are inclined and have lower longitudinal edges (21) that run obliquely downward;
    directing still hot, humid waste air through the heat exchanger (12) and along outer walls of the heat exchanger plates (13);
    allowing condensate to form in the heat exchanger (12) as the waste air cools, wherein the condensate separates the waste air, at least in part, from accompanying substances contained in the waste air, whereby the accompanying substances deposit on the outer walls of the heat exchanger plates (13);
    allowing the condensate, which forms on the outer walls of the heat exchanger plates (13), to flow off of the heat exchanger plates (13), thereby rinsing off the accompanying substances from the outer walls of the heat exchanger plates (13); and
    collecting the condensate, which rinses off the accompanying substances from the outer walls of the heat exchanger plates (13), at the outlet end (16) of the heat exchanger (12).

2. The method according to claim 1, wherein the waste air heats a liquid in the heat exchanger (12).

3. The method according to claim 1, wherein, during the formation of the condensate, the waste air is separated from at least some of the accompanying substances.

4. The method according to claim 1, wherein the accompanying substances, at least in part, are washed out of the waste air, by the condensate.

5. The method according to claim 1, further comprising directing the condensate with the accompanying substances flowing off of the outer walls of the heat-exchanger plates (13) out of the heat exchanger (12).

6. The method according to claim 5, wherein the accompanying substances are entrained when the condensate flows off of the outer walls of the heat-exchanger plates (13), and wherein the accompanying substances flow off of the outer walls of the heat-exchanger plates (13) together with the condensate.

7. An apparatus for treating waste air from laundry machines, comprising a heat exchanger (12) with heat-exchanger plates (13), wherein:
    the heat-exchanger plates (13) are arranged in an upright state in a housing (14) of the heat exchanger (12),
    the heat exchanger plates (13) have longitudinal edges (21) that run in an inclined state such that the lower longitudinal edges (21) run obliquely downward so as to allow condensate, which forms on outer walls of the heat exchanger plates (13), to flow off of the heat exchanger plates (13), and
    a plurality of the heat-exchanger plates (13) are spaced apart from, and run parallel to, one another in the housing (14) of the heat exchanger (12), whereby upright flow channels (22) for the waste air are created between outside surfaces of adjacent ones of the heat-exchanger plates (13) and wherein the waste air flows along the outside surfaces of the heat exchanger plates (13),
    whereby impurities in the waste air are washed off of the outer walls of the heat exchanger plates (13) by the condensate.

8. The apparatus according to claim 7, wherein each of the heat-exchanger plates (13) has opposite heat-exchanger surfaces (20).

9. The apparatus according to claim 8, wherein the heat-exchanger plates (13) are arranged in an upright state such that the heat-exchanger surfaces (20) run vertically or inclined in relation to the vertical.

10. The apparatus according to claim 7, wherein the heat-exchanger plates (13) have structured heat-exchanger surfaces (20).

11. The apparatus according to claim 7, wherein at least lower longitudinal edges (21) of the heat-exchanger plates (13) are spaced from a base (26) of the housing (14).

12. The apparatus according to claim 7, further comprising at least one flow channel for a liquid which is to be heated by the waste air is arranged in an interior of the heat-exchanger plates (13).

13. The apparatus according to claim 12, wherein:
    each of the heat-exchanger plates (13) is formed from two metal sheets (23) which each form a heat-exchanger surface (20),
    the two metal sheets (23) are connected to each other in a liquid-tight manner all the way around their edges,
    in the region of the heat-exchanger surface (20), the two metal sheets (23) are connected by a grid of weld spots, and
    the two metal sheets (23) are spaced apart from one another between the weld spots in order for the at least one flow channel to be formed between the two metal sheets (23) and the weld spots.

* * * * *